Nov. 17, 1942.    M. HOYLE    2,302,550
DUCT JACK
Filed Oct. 16, 1940
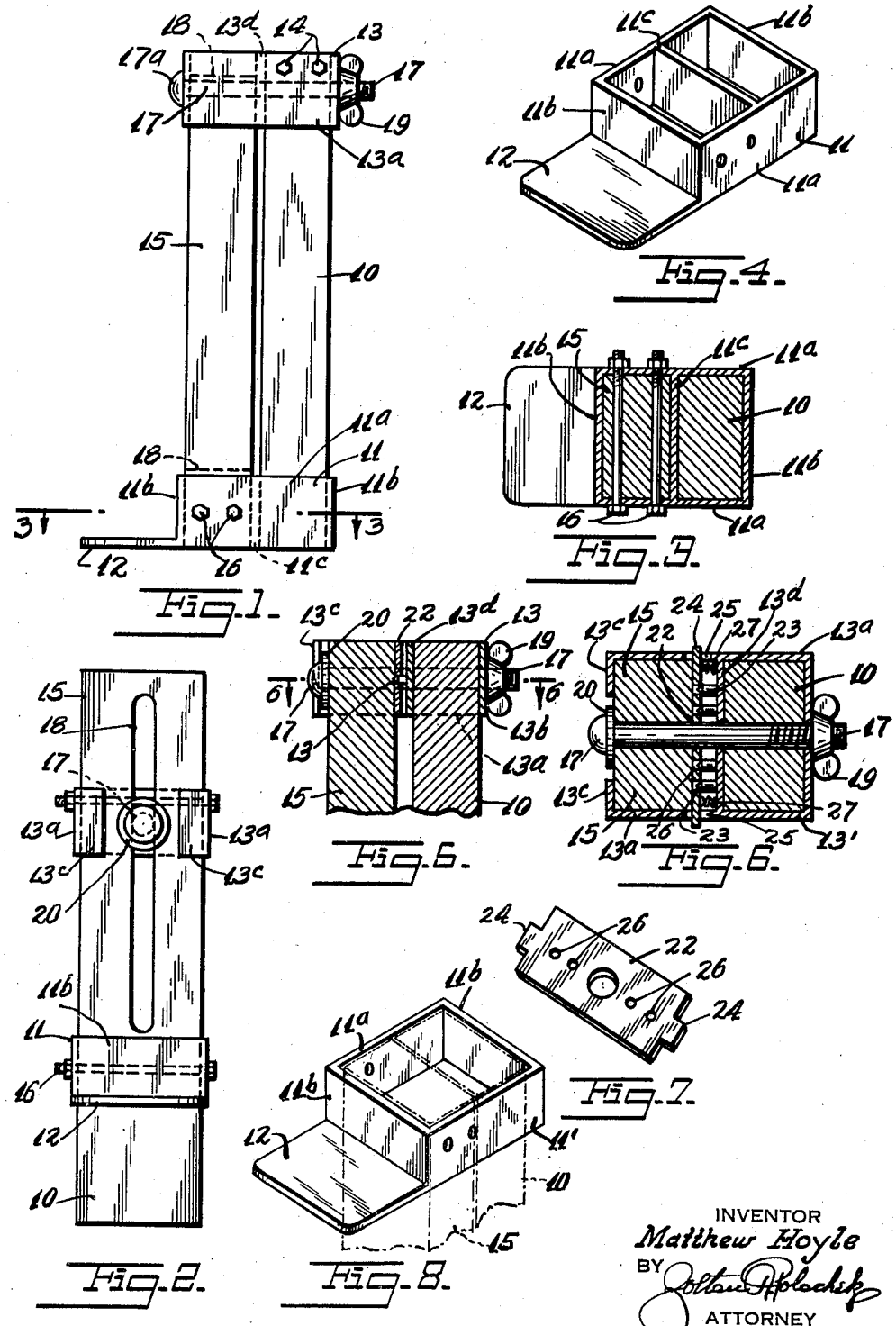
INVENTOR
Matthew Hoyle
BY
ATTORNEY Patented Nov. 17, 1942

2,302,550

UNITED STATES PATENT OFFICE 2,302,550

DUCT JACK

Matthew Hoyle, Brooklyn, N. Y.

Application October 16, 1940, Serial No. 361,446

3 Claims. (Cl. 248—161)

This invention relates to new and useful improvements in a duct jack.

The invention has for an object the construction of a duct jack which is characterized by a longitudinal support, guide members, a bar, and a clamp mounted in a specific way thereon.

Still further the invention contemplates arranging a guide member slidably on the support and providing the guide member with a duct support element, and connecting this guide member with a bar associated with a second guide member and having the clamp means previously named.

Still further the invention contemplates to so arrange the various parts that the guide member with the duct support element may be secured in various adjusted positions.

Still further the invention contemplates a novel construction of the clamp for accomplishing the securing previously mentioned.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a side elevational view of a duct jack constructed in accordance with this invention.

Fig. 2 is a front elevational view of Fig. 1 but illustrated with the parts in a different position.

Fig. 3 is a horizontal sectional view taken upon the line 3—3 of Fig. 1.

Fig. 4 is a perspective view of one of the guide members.

Fig. 5 is a fragmentary vertical sectional view of the top portion of a duct jack constructed in accordance with another form of this invention.

Fig. 6 is a horizontal sectional view taken on the line 6—6 of Fig. 5.

Fig. 7 is a perspective view of a jack plate used in Figs. 4 and 5.

Fig. 8 is another view similar to Fig. 4 but illustrating another form of the invention.

The duct jack, in accordance with this invention, includes a longitudinal support 10 which is adapted to be stationarily mounted on a wall, floor, ceiling, or other stationary part. A guide member 11 is slidably mounted on the support 10 and is provided with a duct support element 12. This duct support element is adapted to be attached to, or engaged beneath, or in any other manner support an air duct or other type of duct construction. Another guide member 13 is spaced from the first named guide member 11 and is fixedly mounted on the support 10 by several fastening elements 14. These fastening elements comprise bolts and nuts engaged through the materials of the guide member 13 and the material of the support 10.

A bar 15 is fixedly mounted on the first named guide member 11 and extends along said support 10 and through the second named guide 13. Several fastening elements 16, such as bolts and nuts, are engaged through the material of the guide member 11 and of the bar 15 for fixedly connecting these parts together. The guide member 13 is provided with a clamp for holding the support 10 and the bar 15 in various longitudinal fixed positions relative to each other. This clamp includes a bolt 17 passing through a longitudinally extending elongated slot 18 formed in the bar 15 and through openings formed in the support 10 and guide member 13. A wing nut 19 is threadedly engaged on the bolt 17 by which the bolt may be loosened and drawn tight as required.

The guide member 11 is in the form of a frame having side walls 11a and end walls 11b connected together in an integral unit. The duct support element 12 is in the form of an extension formed on the bottom edge of one of the end walls 11b. A transverse partition 11c divides the compass between the walls into two sections. The bottom end of the support 10 freely engages within one of these sections so that the guide member may slide up and down on the support. The lower end of the bar 15 engages into the other section. As previously stated, the bolts 16 fixedly connect the bar 15 with the guide member 11.

The guide member 13 is in the form of a frame having side walls 13a, an end wall 13b connecting together one of the ends of the side walls, and end wall sections 13c continuing from the other ends of the side walls and partially extending across the outer face of the bar 15. The head of the bolt 17 is located between the end wall sections 13c. A washer 19 is engaged beneath the head 17a of the bolt 17. This washer extends across the slot 18 and engages the material to the sides of the slot. The guide member 13 is provided with a central partition 13d dividing it into two sections. The upper end of the support 10 engages one of these sections and at this point is held by the bolt 14. The upper end of the bar 15 slidably engages into the other section of the guide member.

The operation of the device is as follows:

The support is attached to a wall or other surface and the wing nut 19 may be loosened and then the bar 15 and the guide member 11 which is attached to the bar may be adjusted relative to the support 10 to any desired degree, for example, to the position as illustrated in Fig. 2 to cause the duct support element 12 to engage flush against the bottom face of the air duct to be supported. Then the wing nut 19 may be tightened to cause the bolt 17 to clamp the parts in their new positions and support the air duct against sagging. An important feature of the construction resides in the provision of the partitions 11ᶜ and 13ᵈ which hold the support 10 and bar 15 properly spaced and serve to guide the relative movements of these parts.

In Figs. 5 to 7 inclusive, a modified form of the invention has been disclosed which distinguishes from the prior form in the fact that a clamp plate 22 is movably mounted in one of the sections of the top guide member 13′, and is cooperative with a plurality of pins 23 in a certain manner to facilitate the action of the clamp. More specifically, the pins 23 project from the partition 13ᵈ. The plate 22 has lugs 24 at its ends engaging into openings 25 formed in the side walls 13ᵃ of the guide member. The pins 23 are aligned with and extend into openings 26 formed in the plate 22. Several springs 27 urge the plate 22 away from the partition 13ᵈ. The bar 15 is disposed between the side walls 13ᵃ, the end wall sections 13ᶜ and the plate 22.

When the wing nut 19 is screwed down tightly, the bar 15 will be flexed slightly and move towards the partitions 13ᵈ so that the pins 23 dig into and grip the bar, as illustrated in Fig. 5. This insures the tight gripping and holding of the clamp. When the wing nut 19 is screwed loose the flexibility of the bar 15 and the springs 27 will move the plate 22 away from the partition 13ᵈ so that the pins 23 disengage from the bar 15. The bar 15 is now free to be adjusted for the reasons previously described.

In Fig. 8 the support 10 and the bar 15 are illustrated in the guide member 11′ without any transverse partition. In this guide member, the support 10 and the bar 15 are slightly separated to permit relative sliding motion of same without any friction between them.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a duct jack having a rectangular guide member fixedly mounted on one end of a support and having a bar slidably extended therethrough, an opening extending transversely through said support, a clamp screw passing through an elongated slot in said bar and said opening, a partition integrally formed on said guide member and disposed between the adjacent faces of said support and said bar, and pins fixedly mounted on one face of said partition and directed towards said bar, whereby when said clamp screw is tightened said bar will be drawn towards said partition causing said pins to enter the sides of said bar when said bar is in any one of several adjusted positions relative to said support to lock said bar against movement relative to said support.

2. In a duct jack having a rectangular guide member fixedly mounted on a support and having a bar slidably extended therethrough and a clamp screw passing through an elongated slot in said bar and an opening in said support, a partition integrally formed in said guide member and disposed between the adjacent faces of said support and bar, and pins mounted on one face of said partition and directed towards said bar, whereby when said clamp screw is tightened said bar will be drawn towards said partition causing said pins to enter the sides of said bar in various adjusted positions of said bar relative to said support and lock said bar against movement relative to said support, and means for urging said bar away from said partition as said clamp screw is loosened disengaging said pins from said bar thereby freeing said bar to permit it to be moved relative to said guide member and support.

3. In a duct jack having a rectangular guide member fixedly mounted on a support and having a bar slidably extended therethrough, a clamp screw passing through an elongated slot in said bar and a transversely extending opening in said support, a partition integrally formed in said guide member and disposed between the adjacent faces of said support and said bar, a plurality of pins mounted on one face of said partition and directed towards said bar, whereby when said clamp screw is tightened said bar will be drawn towards said partition causing said pins to enter a side of said bar when said bar is in any one of several adjusted positions with respect to said support and lock said bar against movement relative to said support, a plate slidably mounted on said guide member having a plurality of openings and in alignment with said pins, said pins extending through said plate for engagement with said bar, said plate being positioned intermediate said bar and said partition, and means tending to continually urge said plate and said bar away from the adjacent face of said partition.

MATTHEW HOYLE.